Jan. 30, 1940.  J. F. McWHORTER ET AL  2,188,721
METHOD OF LAMINATING
Filed July 19, 1935  2 Sheets-Sheet 1
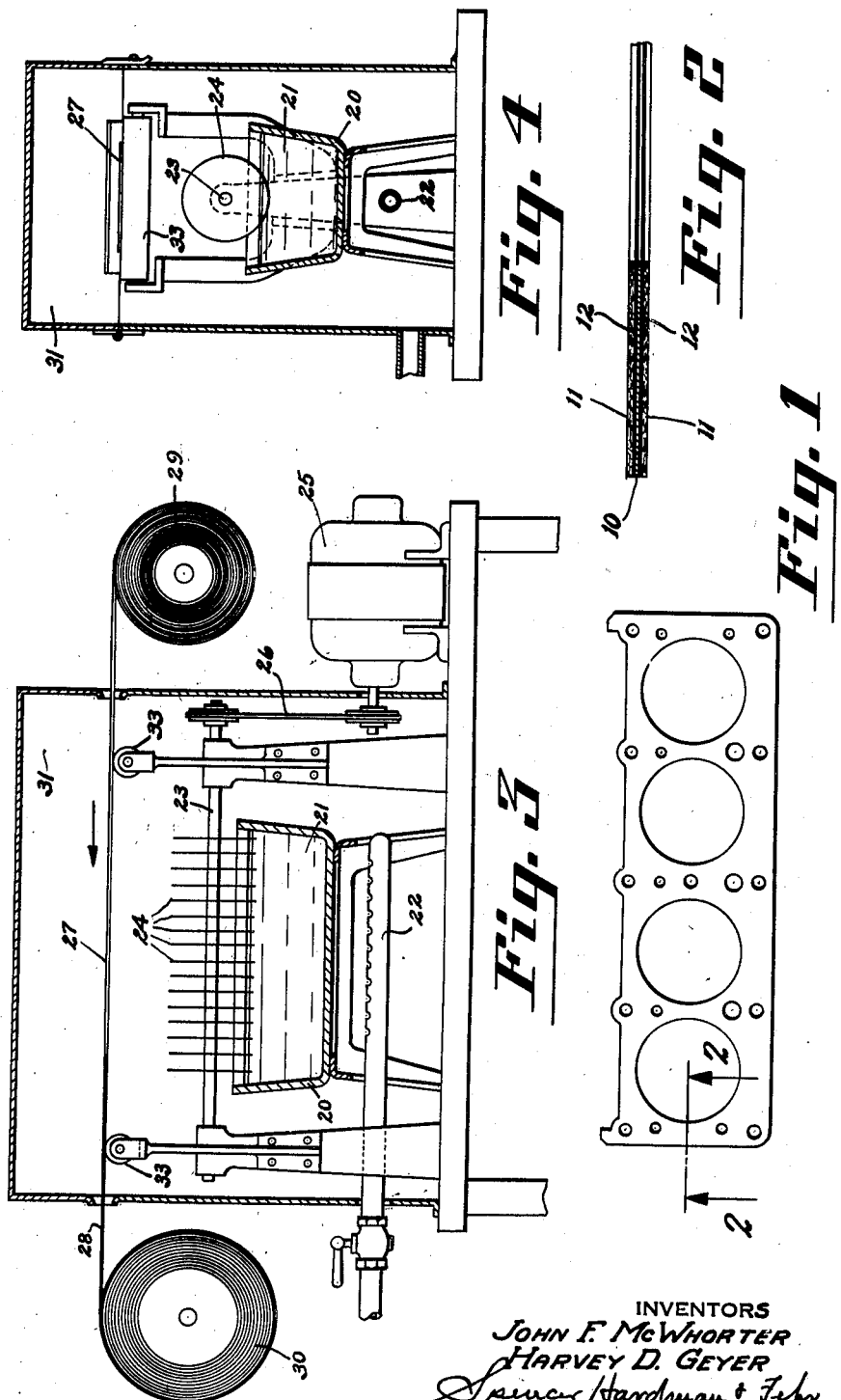
INVENTORS
JOHN F. McWHORTER
HARVEY D. GEYER
Spencer Hardman & Fehr
ATTORNEYS Jan. 30, 1940.   J. F. McWHORTER ET AL   2,188,721
METHOD OF LAMINATING
Filed July 19, 1935   2 Sheets-Sheet 2

INVENTORS
JOHN F. McWHORTER
HARVEY D. GEYER
Spencer Hardman & Jehn
ATTORNEYS

Patented Jan. 30, 1940

2,188,721

UNITED STATES PATENT OFFICE 2,188,721

METHOD OF LAMINATING

John F. McWhorter and Harvey D. Geyer, Dayton, Ohio, assignors to General Motors Corporation, Detroit, Mich., a corporation of Delaware Application July 19, 1935, Serial No. 32,174

4 Claims. (Cl. 154—40)

This invention relates to packing gaskets such as automobile engine head gaskets, and a method of making same.

An object of this invention is to provide an improved form of gasket having a reinforcing metal sheet, preferably steel, and sheets of asbestos fiber or other non-metallic fibrous material strongly surface bonded to the reinforcing sheet by a relatively thin stratum of relatively low melting metal.

Another object of the invention is to provide a simple economical and highly efficient method of bonding such fibrous sheets to the reinforcing sheet.

Further objects and advantages of the present invention will be apparent from the following description, reference being had to the accompanying drawings wherein a preferred embodiment of the present invention is clearly shown.

In the drawings:

Fig. 1 is a face view of an automobile engine head gasket made according to this invention.

Fig. 2 is a section on line 2—2 of Fig. 1.

Figs. 3, 4 and 5 illustrate steps in the method of making the gaskets.

Fig. 3 illustrates the spray-coating of an asbestos fiber sheet with a thin coating of relatively low-melting metal.

Fig. 4 is an end view of the apparatus of Fig. 3.

Fig. 5 illustrates the further steps of the method, namely, the dip coating of the reinforcing steel sheet with a relatively low-melting metal and the bonding of two separate spray-coated fiber sheets to the coated steel sheet shortly after it emerges from the dip-coating metal and while said dip-coating metal is still in fluid or plastic condition. The method illustrated in continuous.

Similar reference characters refer to similar parts throughout the several views.

Figure 5:
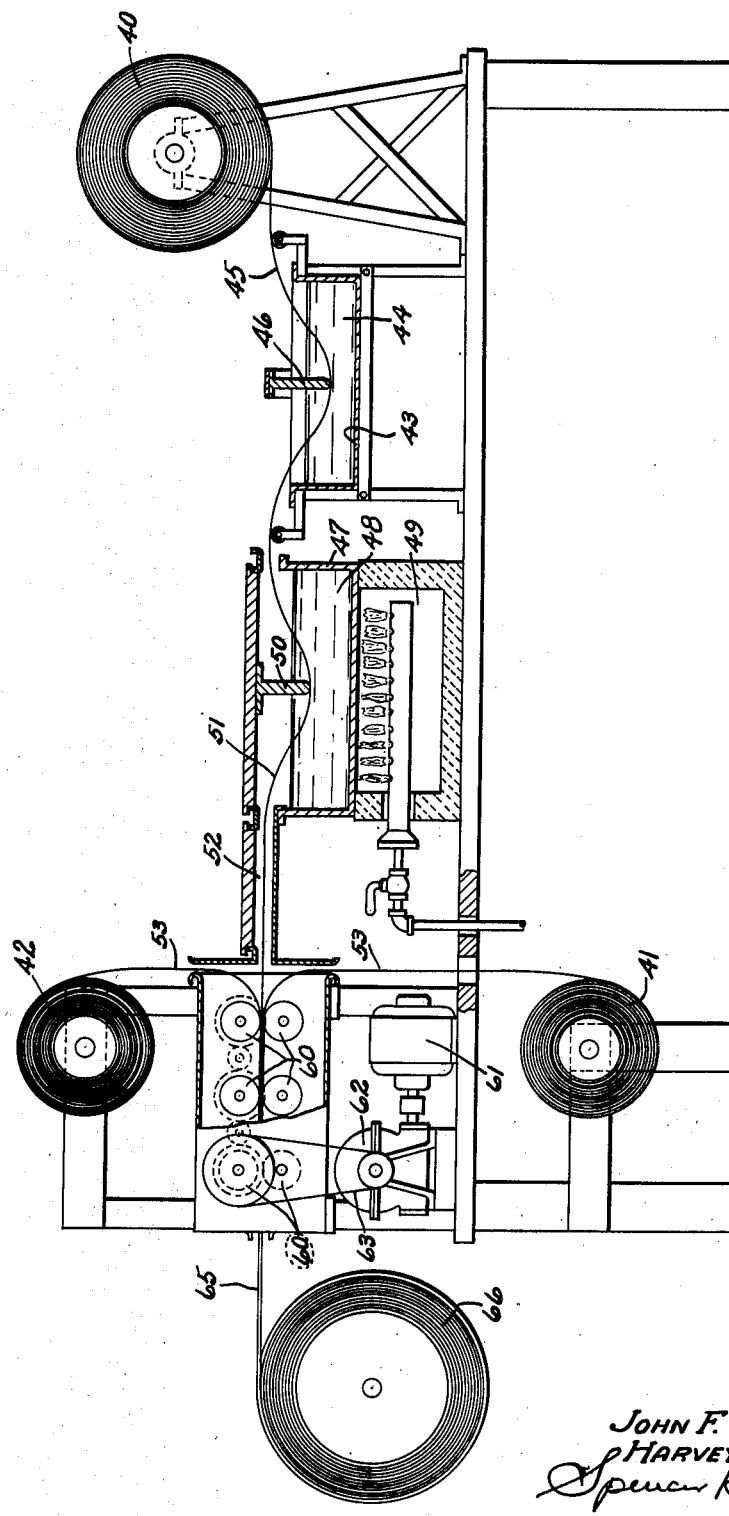

The automobile engine head gasket shown in Figs. 1 and 2 comprises a central reinforcing metal sheet 10, preferably steel, and two asbestos fiber sheets 11 very strongly bonded to the steel sheet by relatively thin strata 12 of a suitable relatively low-melting metal such as tin, zinc, lead, copper, bismuth, cadmium or any suitable low-melting alloy or alloys of such metals. The bonding strata 12 are keyed or interlocked into the fiber interstices of the fibrous sheets 11 whereby said fibrous sheets are firmly held in place over the entire contacting surface with the metal sheet 10 and hence can be pulled loose therefrom only by tearing off the unbonded layers of the fibrous sheets, that is to say, the bond is stronger than the fiber sheet 11 itself. For engine head gaskets, or any gaskets which must withstand similarly high temperatures, the fiber sheets 11 preferably are of asbestos fabric and the low-melting metal strata 12 are chosen of such metal or alloy that it can properly withstand the high temperatures experienced in use thereby without melting.

In the method of this invention a long unperforated blank is first made comprising a central steel sheet with the two asbestos sheets bonded thereto by the bonding strata 12. The desired design of engine head gasket or any other design of gasket is then simply punched or cut out of this long blank by suitable dies. In making the blank, one surface of each of two asbestos sheets is spray-coated with molten metal to provide a strongly adhering relatively thin coat of low-melting metal thereon. Both sides of the central steel sheet 10 is properly coated with a low-melting metal or alloy which will readily bond to the spray coat at a convenient temperature. For this purpose it has been found practical to suitably flux the steel sheet and then dip it into a molten alloy comprising 20 parts copper, 40 parts lead, and 40 parts tin, which coats the steel sheet 10 on both sides thereof in a simple and efficient manner. This coated steel sheet is then run through a pair or a series of pairs of pressure rolls with the two spray-coated asbestos sheets pressed against its opposite sides while the dip coating on the steel sheet is yet in fluid or plastic condition, that is, before it has cooled off sufficiently to become solid. The pressure of the rolls causes the spray coats on the two asbestos sheets to solder or alloy with the dip coat on the steel sheet and thus very strongly bond the asbestos sheets to the steel sheet throughout their entire contacting surfaces. This method is illustrated in Figs. 3, 4 and 5.

Figs. 3 and 4 illustrate an apparatus by which the asbestos sheets may be suitably spray coated. This apparatus comprises a container 20 in which a supply of the above described low-melting metal 21 is kept in a molten state by the gas burner 22 located under the container 20. Directly above container 20 is mounted a rotating shaft 23 having a series of thin metal spraying disks 24 fixed thereto, these disks 24 being of a metal having a melting point sufficiently high to prevent damage thereto by insertion into the molten metal 21. The level of the molten metal 21 is maintained so that only the lower portions of disks 24 are immersed therein. Now when shaft 23 is driven at a suitably high speed by the motor 25 and the drive belt 26, the thin spray disks 24 will pick up the molten metal and throw it off radially in fine particles and at high speed. The higher the speed of rotation of disks 24, the smaller will be the size of the metal particles thrown off thereby, and vice versa within limits. Thus the average size of the metal particles may be varied to give the best adherence to the particular non-metallic fibrous sheet which is being spray-coated.

The fibrous sheet 27 which is being spray-coated passes lengthwise at a suitably slow speed directly across the path of the metal spray from disks 24 until a uniform spray coat 28 of the desired thickness has been applied thereto. The molten metal particles are projected with such high speed against the fibrous sheet 27 that they partially penetrate into the interstices between the fibers thereof while said particles are yet in molten or plastic state and thus the spray coat is substantially keyed to the fibrous sheet 27 upon the immediate solidification by cooling of these metal particles. If the sheet 27 be of some vegetable fiber the molten particles should be quite fine and be of a suitable low-melting alloy which will not burn the vegetable fiber to any material extent before cooling off. If the sheet 27 be of asbestos fibrous material a higher melting metal or alloy may be used and also a deeper penetration into the sheet without any harmful results to the fibrous sheet. As stated above, the size of the metal particles may be readily adjusted by adjusting the rotary speed of disks 24 to give the best results with the particular fibrous material being used, considering both the kind of fiber thereof and the coarseness or looseness of its fibers.

Suitable reels 29 and 30 are mounted at each end of the apparatus of Fig. 3, and the continuous length of the uncoated fibrous sheet 27 is unwound from reel 29, passes through the spray chamber 31, and the spray-coated sheet is wound up on reel 30 after it emerges from the spray chamber. This spraying operation is preferably continuous until the entire roll of fibrous sheet is spray-coated, and the roll may be of any convenient size or length. The portion of the fibrous sheet 27 within chamber 31 may be suitably supported upon the rollers 33 which maintain the sheet 27 at a uniform distance from the spraying disks 24. It is preferable to spray the metal particles through an atmosphere of non-oxidizing or reducing gas in order to prevent partial oxidation of the fine particles during transit or after they have been deposited upon the fibrous sheet 27. For this purpose the chamber 31 is preferably kept filled with a suitable reducing atmosphere all during the spraying operation.

The subsequent steps in the method of this invention are illustrated somewhat diagrammatically in Fig. 5. 40 designates a roll of uncoated sheet steel on both sides of which are to be bonded the spray-coated asbestos sheets from the two rolls 41 and 42, these asbestos sheets having been first spray-coated in the apparatus shown in Fig. 3 as above described. 43 is a flux tank containing a suitable flux 44 into which the steel sheet 45 is led as it proceeds from the roll 40. 46 is a stationary guide which may be used to keep the steel strip 45 submerged in the flux 44 so that both sides of the steel strip will be thoroughly coated with the flux. 47 is a container for the molten low-melting alloy 48 with which the steel sheet 45 is dip-coated. This alloy 48 is melted and maintained in the desired molten condition by a suitable gas furnace 49 thereunder. 50 is one form of a suitable stationary guide which may be provided to keep the steel strip 45 fully submerged in the molten alloy 48 as it passes therethrough. Suitable lateral guides (not shown) for the steel strip 45 may also be used. As the steel strip emerges from the molten alloy 48 at 51 it is completely coated with an adhering still molten film of this alloy. From this point it passes through the chamber 52 which is maintained at such a temperature that by the time the dip-coated steel sheet reaches the pressure rollers 60 the alloy coating thereupon is still in a fluid or preferably semi-fluid state. In this condition the steel strip together with the two spray-coated asbestos strips 53, from rolls 41 and 42 respectively, passes between the pressure rollers 60 with the spray coats 28 on the asbestos strips in pressure contact with the dip coats on the steel strip. These rollers 60 are so adjusted as to apply sufficient pressure to cause the spray coats to strongly bond to the dip coat on the steel strip by a soldering or alloying action, since by the time the assembled strips have passed through the last set of pressure rollers 60 the alloy has become sufficiently cooled to become solid and firmly hold the asbestos strips to the steel strip. Fig. 5 shows three pairs of pressure rollers 60, all of which are geared together by suitable intermediate gears and driven by the electric motor 61 through a gear reduction unit 62 and the chain or belt drive 63. A different pressure adjustment for each pair of rollers 60 may be had if desired, the first pair of rollers 60 preferably serving primarily as guide rollers for aligning and smoothing out the three strips to be bonded together. If desired only a single pair of pressure rollers may be used. The completely bonded strips or integral strip 65 passes from the last pair of rollers 60 and is shown in Fig. 5 as being rolled up on the storage drum 66. Strip 65 may if desired be passed directly to a shearing machine and cut up into suitable lengths and stored in flat form rather than be rolled up on a drum. The above described operation shown in Fig. 5 is preferably continuous until the entire length of steel strip on roll 40, which may be of any convenient size, is used up. The integral strip 65 forms the blank from which the desired design of gaskets may be rapidly punched out by suitable dies. If desired the punched out gasket may be coated with a graphite bearing solution of pyroxylin or may be given such other known treatment as is desired prior to use as an engine head or other gasket. Gaskets made according to this invention are suitable for sealing intake and exhaust manifolds on automobile engines and the like, or joints in pipe lines used to convey water, gas, steam or other gases and liquids at high pressure, or any other desired application.

While the embodiment of the present invention as herein disclosed, constitutes a preferred form, it is to be understood that other forms might be adopted, all coming within the scope of the claims which follow.

What is claimed is as follows:

1. The steps in the method of making a laminated sheet consisting of a non-metallic fibrous lining bonded to a metal sheet, comprising: providing a relatively thin spray coat of a low-melting metal upon said fibrous lining by throwing fine particles of molten low-melting metal with high speed against said fibrous lining and thereby causing a keyed adherence thereto, further coating said metal sheet with a metal which will readily bond to the metal forming said spray coat, then pressing the spray-coated surface of the fibrous lining against the coated surface of said metal sheet while the coating on the metal sheet is in a fluid or semi-fluid state and thereby surface-bonding said spray coat to the metal coat upon said metal sheet.

2. The steps in the method of making a laminated sheet consisting of a non-metallic fibrous lining bonded to a metal sheet, comprising: providing a relatively thin spray coat of a low-melting metal upon said fibrous lining by throwing fine particles of molten low-melting metal with high speed against said fibrous lining and thereby causing a keyed adherence thereto, dip coating said metal sheet with a molten metal which will readily bond to the metal forming said spray coat, then progressively passing said metal sheet and fibrous lining between pressure rolls with their coated surfaces in pressure contact while said dip-coating is still in plastic condition and thereby strongly surface-bonding said contacting metal coats together.

3. The steps in the method of making a laminated sheet having an inner metal sheet and a lining sheet of fibrous material strongly surface-bonded to each face of the metal sheet, comprising: metal-coating one face of each of two fibrous sheets by throwing fine particles of molten low-melting metal by means of centrifugal force with such high speed against said fibrous sheets as to cause particles of the metal coating to embed themselves into the fibrous sheets to a substantial depth, further coating both sides of said metal sheet with a metal which will readily bond to the metal coatings on said fibrous sheets, then pressing the metal-coated surfaces of the two fibrous sheets against the metal-coated surfaces of said metal sheet at a temperature which will strongly bond the contacting metal coats together.

4. The steps in the method of making a long continuous strip of laminated material, comprising: metal-coating one face of each of two long continuous strips of fibrous material by throwing fine particles of molten low-melting metal thereupon by means of centrifugal force with such high speed as to cause particles of said metal to embed themselves into the fibrous material to a substantial depth, further coating both sides of a long continuous metal strip with a metal which will readily bond to the metal coatings on said fibrous strips, and then while the coatings on said metal strip are in a fluid or semi-fluid state progressively passing said metal strip and said two fibrous strips between pressure rolls with their metal-coated surfaces in pressure contact and thereby strongly bonding the three metal-coated strips together in a continuous manner for the full length of said strips.

JOHN F. McWHORTER.
HARVEY D. GEYER.